2,784,149

PURIFICATION OF VINYL ACETATE

Stephen S. Dorn, North Arlington, N. J., and Charles William Fairbanks, Wilmington, Del., assignors to E. I. du Pont de Nemours and Company, Wilmington, Del., a corporation of Delaware No Drawing. Application June 25, 1953,
Serial No. 364,215

4 Claims. (Cl. 202—57)

This patent relates to a method of purifying vinyl acetate.

Polymers of vinyl acetate have been known for a long time and have been used in many applications. As is the case with many other polymers, it is desirable that a reasonably pure vinyl acetate, having reproducible and rapid polymerization characteristics be employed in the preparation of a commercially attractive polyvinyl acetate. The types of and amounts of impurities in the monomer will depend on the method of synthesizing and recovering the monomer. Accordingly, the polymer which is produced may be more or less pure, and more or less altered in structural characteristics, depending on the purity of the monomer.

It has been found necessary in the past to further purify monomeric vinyl acetate beyond the level found in the vinyl acetate which is available commercially. One method of purification is to subject the monomer to a prepolymerization step, whereby some of the vinyl acetate and most of the impurities are removed as a polymeric substance, thus purifying the monomer which can then be polymerized to form a high quality polymer. The obvious disadvantage of such a system is that valuable monomer is lost by this process. The amount of vinyl acetate which is prepolymerized may be as much as 25% to 35% of the total charge of raw monomer, and furthermore, there is no easy way of recovering the monomer lost by a prepolymerization step. Other methods of purification of vinyl acetate may be known, but are not as widely used as the prepolymerization method.

The predominant impurity in vinyl acetate has been found to be divinyl acetylene. Some monovinyl acetylene, acrolein, or hexatriene may be present in commercial vinyl acetate used for polymerization but these compounds are usually present in a much lower concentration than divinyl acetylene.

It is well known that polyvinyl acetate is an intermediate to polyvinyl butyral resin which, in turn, is widely utilized as the interlayer in safety glass laminations used for automobile windows and other purposes. It has been found that stronger safety glass interlayers can be obtained when the vinyl acetate monomer, prior to polymerization, has been treated according to the process of this invention. While it is not intended to limit this invention by any speculation as to the mechanism or chemistry whereby the improvement is attained, it appears that if acetylenic impurities are present in the vinyl acetate monomer which is eventually transformed into a safety glass interlayer, the safety glass will be weaker and less able to withstand impacts without shattering. It is believed that the reason for this loss of strength is that the ultimate polyvinyl butyral resin is more brittle if unsaturated impurities, such as the vinyl acetylenes and acrolein, are present in the vinyl acetate used as a starting material. The process of this invention removes these undesirable impurities and thus produces an improved polyvinyl acetate, from which an improved polyvinyl butyral can be prepared, which in turn permits the manufacture of higher quality safety glass.

It is an object of this invention to purify vinyl acetate by a novel process. It is another object of the present invention to reduce the concentration of unsaturated organic impurities, such as monovinyl acetylene, divinyl acetylene, and acrolein, to a value sufficiently low as to permit the formation of a more useful polyvinyl acetate. Still another object is to prepare a purified vinyl acetate monomer having reproducible polymerization characteristics accompanied by reduced polymerization induction periods. Still another object is to permit the use of a lower quality, and thus cheaper, vinyl acetate as the raw material which may be purified by the process of this invention and then polymerized to form a high quality polymer. Other objects will appear from the more detailed description given herein.

The above objects are accomplished by treating raw vinyl acetate with cyclic thiols in conjunction with, or in the absence of, catalysts to produce a vinyl acetate of improved purity as measured by a divinyl acetylene content of less than 5 p. p. m. Catalysts may be used to speed up the treatment period. It is convenient to report improvement in terms of a reduction in divinyl acetylene content because it appears to be the major contaminant, and because monovinyl acetylene, acrolein, and other unknown impurities, if present in the raw vinyl acetate, are effectively removed or rendered harmless by the process of this invention when the divinyl acetylene content is reduced to 5 p. p. m. or less. Consequently, only the reduction of divinyl acetylene content is shown in many of the following examples, although spot checks by ultraviolet analysis revealed the absence of acrolein and other identifiable impurities.

The following examples serve to illustrate the various embodiments of this invention.

*Example 1*

Several 200-gram samples of raw commercial vinyl acetate were prepared for testing. Varying amounts of a mixture of ethyl- and dimethyl-mercaptothiazoles were placed in some of the vinyl acetate samples. The sample bottles were then tightly stoppered, the contents swirled to assure adequate mixing, and the sample bottles were allowed to stand at room temperature for different lengths of time.

After standing for a desired length of time, known hereinafter as the "time of treatment," the sample was distilled in the following manner. The entire 200-gram sample was placed in a 300 ml. round bottom flask fitted with a modified Vigreux column, eight inches in length, which was connected to a total takeoff, still-head condenser, and a 100 ml. receiver. A vacuum adapter was connected to the lower end of the condenser, with the inner tube going to the bottom of the 100 ml. receiver. The 300 ml. flask was heated in a water bath. The condenser was cooled with methanol circulating through a copper coil immersed in a "Dry Ice"-methanol mixture. The receiver was also cooled by a "Dry Ice"-methanol bath. The distillation was effected by boiling the water bath surrounding the 300 ml. flask and collecting the first 100 ml. condensate. The concentration of divinyl acetylene in the condensate was then determined. Such analyses may be made by employing ultra-violet absorption spectra that have been calibrated with vinyl acetate monomer samples purified by exhaustive prepolymerization and containing added known quantities of divinyl acetylene. Unless otherwise stated herein, the monovinyl acetylene concentration was not determined because there was little or no monovinyl acetylene in a majority of the raw vinyl acetate used.

In addition to a determination of the impurities, the following test was employed to determine the ability of the purified and distilled vinyl acetate, treated as described above, to polymerize quickly. A 10-ml. sample of treated vinyl acetate was placed in an 18 x 150-mm. test tube and there was added 0.4 ml. of a 5% solution of benzoyl peroxide in pure vinyl acetate. The tube was fitted with a cork stopper which held a small glass air condenser, and was placed in a 70° C. constant temperature bath. The time required for the vinyl acetate to bubble and froth is called herein the polymerization "activity."

Table I shows the results from treating raw vinyl acetate with mixed ethyl- and dimethyl-mercaptothiazoles, distilling the treated vinyl acetate, and testing the purified vinyl acetate as described above. The blank was not treated with any compound but was distilled as described above, and then tested for impurities and activity.

TABLE I

| Sample | Amount of Mixed Thiazoles (p. p. m.) | Time of Treatment (hours) | Divinyl Acetylene (p. p. m.) | Activity (min.) |
|---|---|---|---|---|
| Blank | None | None | 6.3 | 56.7 |
| A | 275 | 67 | 1.1 | 35.1 |
| B | 1,000 | 19 | 6.4 | 38.6 |

In a similar experiment on a different bath of raw vinyl acetate, the untreated vinyl acetate after distillation had a concentration of 8.2 p. p. m. divinyl acetylene and an activity of 49.1 min. The same raw vinyl acetate after treatment with 2000 p. p. m. of mixed ethyl- and dimethyl-mercaptothiazoles for 29 hours, followed by distillation, had a concentration of less than 0.5 p. p. m. divinyl acetylene and an activity of 28.9 min.

*Example 2*

Samples of raw vinyl acetate were prepared and treated as described in Example 1 with the exception that beta-thionaphthol was used as the treating agent in place of mixed ethyl- and dimethyl-mercaptothiazoles. A blank showed the presence of 8.2 p. p. m. divinyl acetylene and had an activity of 49.1 min. A sample treated with 2500 p. p. m. of beta-thionaphthol for 45 hours showed a reduction in the divinyl acetylene content to less than 0.5 p. p. m., and an activity of 26.2 min.

Approximately the same results have been obtained by using thiocresol or thiophenol in place of beta-thionaphthol in Example 2.

*Example 3*

In an experiment to determine the relative effectiveness of three treating agents, thiophenol, beta-thionaphthol, and mixed ethyl- and dimethyl-mercaptothiazoles were tested in the purification of raw vinyl acetate containing 15 p. p. m. of divinyl acetylene before the distillation step, according to the procedure described in Example 1. Table II shows the results of this comparative test.

TABLE II

| Agent | Amount of Agent (p. p. m.) | Time of Treatment (hours) | Divinyl Acetylene Content (p. p. m.) | Activity (min.) |
|---|---|---|---|---|
| Blank | None | None | 6.3 | 56.7 |
| Thiophenol | 250 | 68 | 2.8 | 39.2 |
| Beta-thionaphthol | 265 | 67 | 1.6 | 36.7 |
| Mixed ethyl- and dimethyl-mercaptothiazoles | 275 | 67 | 1.1 | 35.1 |

*Example 4*

In this experiment the procedure was the same as described in Example 1 except that catalysts were added to speed up the time of treatment. Into each sample of raw vinyl acetate to be treated there was added 1000 p. p. m. of mixed ethyl- and dimethyl-mercaptothiazoles and 500 p. p. m. of the catalyst utilized. Two blanks were tested, one without catalyst and without mercaptothiazoles, the other without catalyst but containing the mercaptothiazoles. Table III shows the results of utilizing different catalysts in the purification of vinyl acetate.

TABLE III

| Catalyst | Time of Treatment (hours) | Divinyl Acetylene Content (p. p. m.) | Activity (min.) |
|---|---|---|---|
| Blank (without catalyst, without mercaptothiazoles) | None | 6.3 | 56.7 |
| Blank (without catalyst, with mercaptothiazoles) | 19 | 6.4 | 38.6 |
| Quinoline | 17 | 2.5 | 44.0 |
| Zinc Oxide | 16 | 2.6 | 43.4 |
| Cadmium Oxide | 17 | 2.9 | 46.2 |

This example shows the decrease in time of treatment required to reduce the content of divinyl acetylene when a catalyst was employed. It should be noted however that the activity is not decreased proportionately. Thus, if, in a particular embodiment of this invention, it is not as important to decrease the activity as it is to reduce the time of treatment, the employment of a catalyst would be very desirable.

*Example 5*

A 200-gram sample of raw vinyl acetate was placed in a 500-ml. Erlenmeyer flask, and 2000 p. p. m. of thiophenol was added to the flask. After the flask was tightly stoppered, the contents were swirled to assure thorough mixing and the flask was allowed to stand for four days. This period is called the "time of treatment" as has been described in the foregoing examples.

The sample, after the above-described treatment, was filtered to remove any solids and was placed in a 500 ml. round bottom flask connected to a 60 cm. modified Vigreux column equipped with a total-reflux, partial-take-off still head. The flask was heated with a "Glas-Col" heater and the receiver was cooled in an ice bath. A foreshot of about 25 ml. (until the boiling point was substantially constant) was taken at a reflux ratio of about 4:1, and discarded. A 100-ml. constant boiling fraction was taken at the same reflux ratio, and retained for testing.

The 100 ml.-distillation fraction was tested to determine the concentration of divinyl acetylene and the polymerization activity of the vinyl acetate. In the determination of activity, a 10-ml. sample of the vinyl acetate fraction and 0.4 ml. of a 5% solution of benzoyl peroxide in pure vinyl acetate were placed in an 18 x 150-mm. test tube. Nitrogen was then bubbled through the solution for one minute. The test tube was fitted with a stopper and an air condenser as described in Example 1, and placed in a 70° C. constant temperature bath. The time required for the vinyl acetate to bubble and froth was called the polymerization "activity" of the vinyl acetate.

In this example, utilizing 2000 p. p. m. of thiophenol and following the procedure just described, a time of treatment of 4 days gave a vinyl acetate containing no monovinyl acetylene, and having an "activity" of 20 min. These results are to be compared with a blank subjected to the same procedure as that described above, but not containing any thiophenol or other added reagent. The blank, after distillation and testing, proved to have 9 p. p. m. divinyl acetylene, and had an "activity" of 28.5 minutes.

In an experiment using 750 p. p. m. thiophenol in place of the 2000 p. p. m. described above, but otherwise the same, the purified vinyl acetate contained less than 0.5 p. p. m. monovinyl acetylene, and had an "activity" of 21 min.

Example 6

The procedure described in Example 5 was followed exactly as described therein, with the exception that a different treating agent was utilized. In this series of experiments the treating agent consisted of thiophenol and sulfur. When 2000 p. p. m. thiophenol and 2000 p. p. m. sulfur were used in conjunction to purify raw vinyl acetate, the purified product had a divinyl acetylene content of less than 1 p. p. m. and had an "activity" of 17.7 min. When 750 p. p. m. each of thiophenol and sulfur were used in conjunction, the "activity" of the purified vinyl acetate was 23 min.

Example 7

The same procedure was followed as described in Example 5 except that a different treating agent and time of treatment were utilized. In one experiment 0.5 gram of concentrated sulfuric acid was employed as the treating agent, and the time of treatment was 93 hours. The vinyl acetate purified by this treatment contained 1 p. p. m. divinyl acetylene and had an "activity" of 23.5 min. as compared to the blank described in Example 5.

In another experiment 0.5 gram of concentrated nitric acid was employed as the treating agent for a time of treatment of 93 hours. The vinyl acetate purified by this treatment contained less than 1 p. p. m. of divinyl acetylene and had an "activity" of 19.8 min.

In another series of experiments, using 200 gram samples of raw vinyl acetate, the treating agent was a 1:1 mixture of concentrated sulfuric acid and concentrated nitric acid. In addition to the steps described in Example 5, one gram of calcium hydroxide was added to neutralize unreacted acid and the solution filtered to remove any solids just prior to distillation. The amounts of mixed acid used, the time of treatment, and the purification effected are shown in Table IV.

TABLE IV

| Amount of Mixed Acid (gram) | Time of Treatment (hours) | Divinyl Acetylene Content (p. p. m.) | Activity (min.) |
|---|---|---|---|
| None | None | 9 | 28.5 |
| 0.5 | 22 | less than 1 | 14.5 |
| 0.25 | 19 | do | 18.2 |
| 0.17 | 19 | do | 17.0 |
| 0.08 | 19 | do | 23.0 |

Example 8

The same procedure was followed as described in Example 5 except that the treating agent utilized consisted of 0.2 gram of reduced iron and 3 drops of bromine. After a treatment time of 7 days, the solution was filtered and distilled as described in Example 5. The resulting vinyl acetate contained less than 1 p. p. m. divinyl acetylene and had an "activity" of 21 min.

Example 9

Following the same procedure described in Example 5, 20 grams of activated decolorizing charcoal were added to the raw vinyl acetate in place of the thiophenol. The flask was allowed to stand for 26 hours with occasional swirling. After this time the charcoal was filtered off and the filtrate distilled according to the procedure of Example 5. The purified vinyl acetate contained 2 p. p. m. divinyl acetylene and had an "activity" of 22.7 min.

Example 10

Known quantities of divinyl acetylene and of acrolein were added separately to purified samples of vinyl acetate and the various mixtures were analyzed by means of an ultraviolet spectrophotometer. Divinyl acetylene showed three absorption peaks at 265, 252, and 240 millimicrons. It was found that an optical density value of 0.4 at an absorption of 265 millimicrons was equivalent to 2 parts per million of divinyl acetylene. Acrolein showed a major absorption peak at 330 millimicrons and therefore the presence of acrolein was readily detectable in vinyl acetate since the latter had a very low absorption at the same wave length.

By the addition of minor amounts of acrolein to purified vinyl acetate, samples were prepared and tested for polymerization activity as described in Example 1. The activity increased from 66 minutes at 1 p. p. m. acrolein to 115 minutes at 1000 p. p. m. acrolein. Raw vinyl acetate samples which were treated with mercaptan agents as described in the preceding examples were subjected to ultraviolet analysis and showed no absorption peak at 330 millimicrons, thus indicating that only negligible amounts, if any, of acrolein were present. The raw vinyl acetate, before treatment, contained some acrolein as indicated by ultraviolet absorption at a wave length of 330 millimicrons.

In order for the objects of this invention to be accomplished, there must be a purification of vinyl acetate such that the purified product is substantially completely free of harmful impurities, which in general are unsaturated organic compounds, including vinyl acetylenes and acrolein. Monovinyl acetylene does not appear to be a troublesome impurity since it is only rarely found to be present in commercial vinyl acetate, probably because it has a very low boiling point, and also, since the process of this invention has been found to remove all traces of monovinyl acetylene when it is present in commercial vinyl acetate. Acrolein is also known to be an impurity in some lots of vinyl acetate, and it has been found that the processes of this invention effectively reduces the concentration of acrolein to a harmless level. Consequently, as previously pointed out, the main description herein refers to the removal of harmful impurities measured in terms of divinyl acetylene, but it is intended that this process is to be applicable to acrolein and to both monovinyl and divinyl acetylene impurities in vinyl acetate. The generic term, vinyl acetylene, is meant herein to include both monovinyl and divinyl acetylene. It is also known that two different samples of vinyl acetate having the same concentration of divinyl acetylene may have different polymerization activities. Thus, there may be unidentified impurities which affect the quality of vinyl acetate. In any case, whether the impurities are vinyl acetylenes, acrolein, or unknown compounds, the process of this invention improves the polymerization characteristics of vinyl acetate, and the results have been correlated by reporting removal of divinyl acetylene, with the understanding that when divinyl acetylene is reduced to a desirable concentration, the other impurities have also been reduced to a harmless concentration.

The ordinary range of concentration of vinyl acetylenes in raw, commercial vinyl acetate is usually found to be no greater than about 10–15 p. p. m. In order for the vinyl acetate to be sufficiently pure for use in making high quality polyvinyl butyral resin, the divinyl acetylene concentration should be reduced to 5 p. p. m. or less. The process of this invention, with slight modification, can purify vinyl acetate containing higher quantities of vinyl acetylene than 15 p. p. m., and form a purified product containing less than 0.5 p. p. m. of vinyl acetylene. However, the preferred process treats a raw vinyl acetate containing up to 15 p. p. m. vinyl acetylene to produce a purified vinyl acetate containing no more than 5 p. p. m. vinyl acetylene, reported in terms of divinyl acetylene.

The compounds, called treating agents in the examples, which have been usefully employed to assist in accomplishing the purification of vinyl acetate by this process are of various types, and include activated charcoal, concentrated sulfuric or nitric acid, mixed concentrated sulfuric and nitric acids, a mixture of bromine and iron, and various sulfur-containing organic compounds. The preferred compounds for the process of this invention are the organic cyclic thiols including thiophenol, thiophenol mixed with sulfur, thiocresol, beta-thionaphthol, and alkyl mercaptothiazoles, particularly a mixture of ethyl- and dimethyl-mercaptothiazoles.

The amount of treating agent used in this process may vary somewhat depending on different embodiments of this invention; however, in general, no more than 2000 p. p. m., based on the vinyl acetate, has been found to be an adequate amount of treating agent for most applications of the process of this invention. The use of charcoal is an exception to this limitation. A much larger amount of charcoal, than the 2000 p. p. m. mentioned above, is required in the operation of this invention. The amount of charcoal may be less than, equal to, or greater than, the amount of vinyl acetate to be purified, the amount of charcoal depending on the purity of the vinyl acetate being treated as well as the purity and activity of the charcoal.

There is a certain time of treatment during which the above-described treating agents are in contact with the vinyl acetate to be purified. In general, the longer the time of treatment, the better will be the purity of the final product. However, practical, commercial requirements may place some limits on this treatment time. If facilities are adequate, the time of treatment may be from three to five days or more. However, the employment of catalysts will materially shorten the time of treatment down to one day or less. Other factors may influence the choice of whether to use catalysts to shorten the time of treatment. For example, it has been found that even though the time of treatment may be shortened, the resulting purified vinyl acetate may have a longer polymerization activity; that is, it may take longer for the vinyl acetate to start polymerizing after being subjected to polymerization conditions. Thus a saving of time in purifying the monomer may be partially cancelled by a longer time required to initiate polymerization.

The step of contacting vinyl acetate with a treating agent with or without a catalyst, as described above, is preferably followed by a fractional distillation by means of which the purified vinyl acetate and lower boiling components are separated from higher boiling components, the latter being further refined or discarded, while the former is used as the monomer to be polymerized. Modifications of such a distillation step will be apparent to skilled scientists; for example, a small foreshot may be discarded to leave a center cut of the distillation as the purified monomeric vinyl acetate.

Catalysts which have been found to be helpful in reducing the time of treatment required to remove vinyl acetylenes from vinyl acetate by this invention include quinoline, zinc oxide, and cadmium oxide. In certain embodiments of this invention ultraviolet light acts as a catalyst; for example when thiocresol is the treating agent. The amount of catalyst employed should in general be about 50% of the amount of treating agent used.

We claim:
1. The process of removing vinyl acetylene impurities from raw vinyl acetate which comprises intimately admixing raw vinyl acetate, containing unsaturated organic compounds as impurities, with an organic cyclic thiol compound in which any substituent group on the cyclic structure other than the thiol radical is a saturated hydrocarbon group, distilling the resulting mixture, and recovering vinyl acetate substantially free of unsaturated organic impurities.

2. The process of improving the polymerization behavior of vinyl acetate which comprises intimately mixing vinyl acetate, containing as an impurity a member of the class consisting of divinyl acetylene, monovinyl acetylene, and acrolein, with less than 1% of a member of the group consisting of beta-thionaphthol, thiophenol, thiocresol, and alkyl mercaptothiazole allowing the mixture to stand for at least 12 hours, and thereafter distilling the mixture and recovering vinyl acetate containing less than 5 parts per million of divinyl acetylene.

3. The process of purifying vinyl acetate which comprises intimately mixing vinyl acetate, containing vinyl acetylene impurities, with less than 1% of an organic cyclic thiol compound in which any substituent group in the cyclic structure other than the thiol radical is a saturated hydrocarbon group, and up to 50%, based on said thiol, of a catalyst selected from the group consisting of quinoline, zinc oxide, and cadmium oxide, allowing the mixture to stand for no longer than 24 hours, and thereafter fractionally distilling said mixture and recovering a cut of purified vinyl acetate containing less than 5 parts per million of divinyl acetylene.

4. The process of improving the polymerization activity of monomeric vinyl acetate which comprises intimately mixing vinyl acetate and less than 1% by weight of alkyl mercaptothiazole, allowing the mixture to stand for no longer than 24 hours in the presence of a catalyst, and thereafter fractionally distilling said mixture and recovering a cut of improved monomeric vinyl acetate containing less than about 2 parts per million of vinyl acetylenic impurities and having a polymerization activity of less than 30 minutes, measured at 70° C. in the presence of a benzoyl peroxide catalyst.

References Cited in the file of this patent
FOREIGN PATENTS 579,787     Great Britain _____ Aug. 15, 1946

OTHER REFERENCES

Berchet et al.: J. A. C. S. 55, 2008–12 (1933).
Fram "Vinyl Acetate" (from "Monomers," by Blont et al., Interscience Publishers, New York), 1949, pgs. 19–20.